Jan. 17, 1950   R. J. BRADLEY   2,495,091
ADJUSTABLE CUTTER

Filed June 8, 1946   2 Sheets-Sheet 1

INVENTOR
ROBERT J. BRADLEY
BY Hyde, Meyer, Baldwin and Doran
ATTORNEYS

Jan. 17, 1950

R. J. BRADLEY 2,495,091

ADJUSTABLE CUTTER

Filed June 8, 1946

INVENTOR
ROBERT J. BRADLEY
BY
*Hyde, Meyer, Baldwin and Doran*
ATTORNEYS

Patented Jan. 17, 1950

2,495,091

UNITED STATES PATENT OFFICE 2,495,091

ADJUSTABLE CUTTER

Robert J. Bradley, Cleveland, Ohio, assignor of one-half to Edmund R. Mecklenburg, Cleveland, Ohio Application June 8, 1946, Serial No. 675,385

6 Claims. (Cl. 29—105)

The invention relates to rotary cutters, and particularly to novel and improved cutting devices of this nature wherein the position of the actual cutting tool is adjustable.

An object of the invention is to provide face cutting means for readily and rapidly varying the radial spacing of the cutting tool from the axis of rotation.

A further object is to provide means for readily and rapidly varying both the aforesaid radial spacing of the tool, and likewise the position of the tool along a line parallel to the axis of rotation.

A further object is to provide rotary edge cutting means wherein the position of the actual cutting tool is longitudinally variable in a direction parallel to the axis of rotation, and is simultaneously variable in a direction normal to the plane of rotation.

A further object is to provide a rotary cutting head comprising a plurality of concentric rings adapted to be assembled in succession, one upon another, each said ring being provided with means for retaining one or more cutting tools thereon, whereby the radial distance of the cutting tools from the center of rotation may be increased or decreased at will by respectively adding or removing a ring at the outer periphery of the cutting head.

Other objects and advantages will be apparent from a study of the following specification in conjunction with the accompanying drawings, in which.

Figure 1:
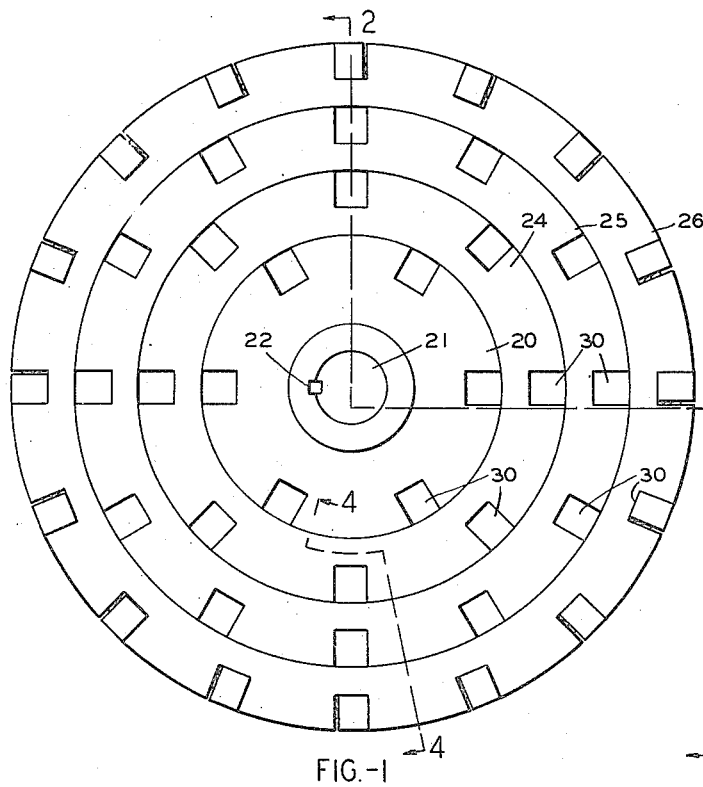
Fig. 1 is a front elevational view of a rotary cutting head constructed in accordance with the teachings of the present invention.
Figure 2:
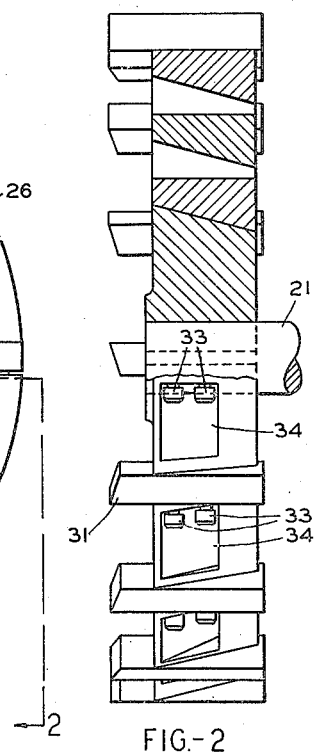
Fig. 2 is a view partly in section and partly in elevation, taken on the line 2—2 of Fig. 1.
Figure 3:
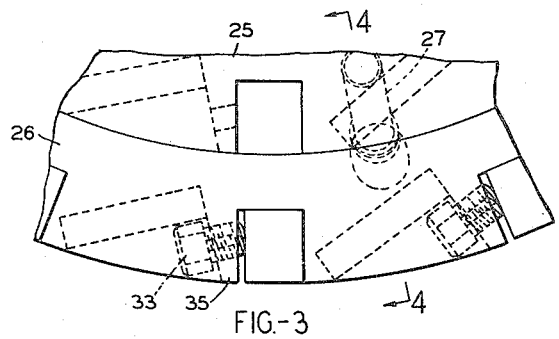
Fig. 3 is a fragmentary view, and somewhat enlarged, showing structural details of the embodiment illustrated in Fig. 1.
Figure 4:
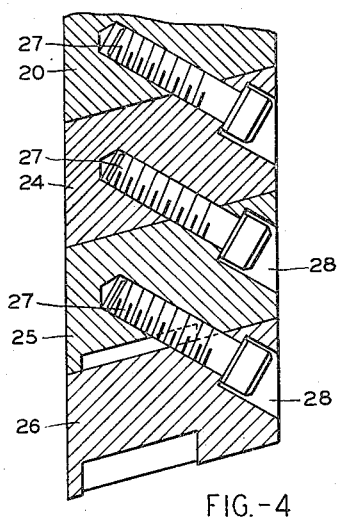
Fig. 4 is a sectional view taken on the line 4—4 of Figs. 1 and 3.
Figure 5:
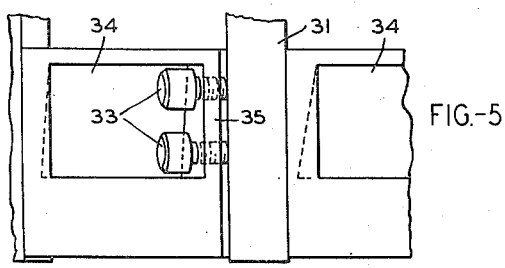
Fig. 5 is a fragmentary side elevation of the cutting head showing a portion of the outer periphery of the cutting head and details of the tool holding means.
Figure 6:
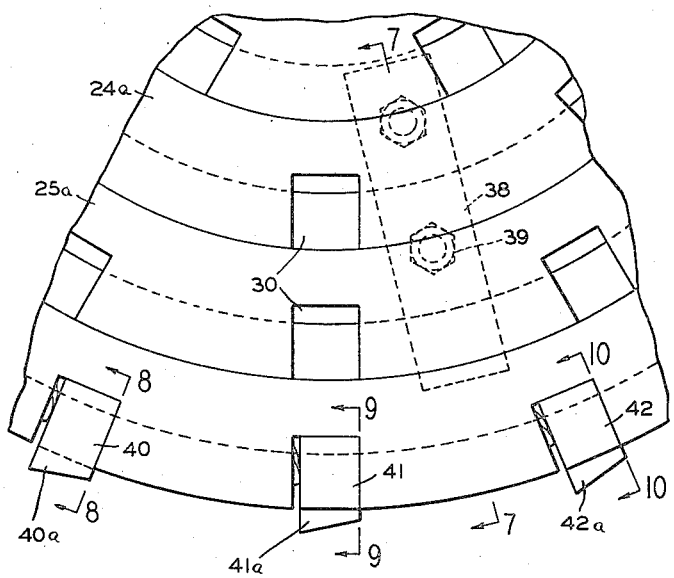
Fig. 6 is a fragmentary front elevational view of a slightly modified form of the invention.
Figure 11:
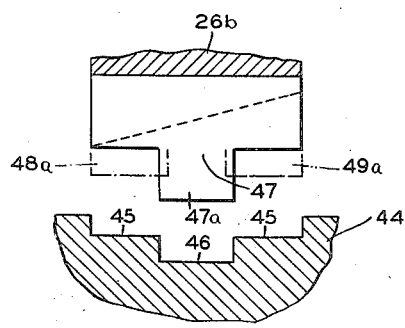

Figs. 7, 8, 9 and 10 are views taken respectively on the lines 7—7, 8—8, 9—9, and 10—10 of Fig. 6;

Fig. 11 is a sectional view of a specific edge structure of a rotary cutter head and work piece, illustrating another adaptation of the invention.

Speaking first generally, the present invention is particularly adapted for use in power driven cutting machines in which a work piece is clamped or otherwise held on a base or bed plate, and a cutting operation is performed by means of one or more cutting tools fixed to a rotatable cutting head. Means are provided for effecting approach movement between the cutting head and the surface of the work piece. Apparatus for performing all said operations is well-known and will not here be shown or described in detail, the present invention being concerned only with the specific novel and improved structure of the cutting head. Those skilled in the art will realize that a cutting operation can be performed equally well either by holding the work and moving the tool, or holding the tool and moving the work; in other words by relative motion between work and tool.

For convenience in the present specification the terminology "face cutting" is used with reference to the type of operation wherein a rotating cutting head carries one or more cutting tools projecting from a face thereof which is generally parallel to the plane of the cutting head rotation, and likewise parallel to the face to be cut. In such face cutting operation successive layers of stock of any suitable thickness are removed over an area approximately coextensive in width with the diameter of the path of rotation of the tool, and of any desired length dependent upon the capacity for endwise travel of the machine bed, or the cutting head carriage. A face cutting operation is particularly adapted to the production of planar surfaces of substantial area.

Likewise, in the present specification, the terminology "edge cutting" is used to define a cutting operation wherein a rotary cutting head of the general type characterized in the last preceding paragraph, carries one or more cutting tools projecting radially from a peripheral edge face of the head. The cutting head is rotatable in a plane normal to the surface to be cut. While an edge cutting operation may be utilized in a variety of ways to produce a respective variety of surface effects, it is particularly adapted to the production of slots, grooves, channels, or undercut areas of limited sizes below the general plane surface of an article. Edge cutting with relatively narrow tools is also frequently used for completely severing portions of an article, or for producing rabeted edge grooves, dovetail grooves, etc.

In the face cutting and edge cutting operations just described it is often desirable to change the effective diameter of the cutting head, thereby changing the radial spacing of the cutting tool from the center of rotation. The present invention provides means for readily and rapidly changing such diameter, and for simultaneously varying the radial spacing of the cutting tool by a simple operation.

Referring now to the drawings, and particularly to Figs. 1 to 5 inclusive, there is shown a cutting head comprising a hub member 20 affixed to a shaft 21 by a key and groove arrangement 22. A plurality of concentric rings 24, 25 and 26, are carried on said hub, each one supported upon the one immediately therebeneath. The outer peripheral surfaces of the hub 20, and the inner and outer peripheral surfaces of rings 24, 25 and 26, are all frusto conical in contour, each such surface being a sliding fit upon the one immediately beneath it. The hub is fixed on the shaft in any suitable way. Ring 24 is attached to the hub by a plurality of fillister head screws 27 inserted from the rear of the cutting head and angularly inclined so as to pass through ring 24 and have a threaded seat in the hub. Recesses 28 are provided wherein the screws are seated to permit the screw heads to be depressed below the plane of the rear surface of the head. Each successive ring is united to the one immediately within it by identical screws in the same way.

The outer periphery of each ring is provided with a circumferentially spaced series of grooves or channels 30 each adapted to receive a substantial portion of the shank of a cutting tool 31. It is normally intended that only the channels in the outer ring of the head assembly contain tools. For face cutting purposes each tool projects forwardly from the face towards the work. Each tool extends substantially normal to the front face of the cutting head, that is to say the face which is generally parallel to the surface to be planed. Each such channel in the outer ring may carry an individual cutting tool, but it is not necessary that each channel be so occupied, and a lesser number of tools may be disposed in any suitable spacing provided the cutting head is not seriously unbalanced so as to give rise to centrifugal strains at high lineal speeds of rotation. Each tool is retained in place by one or more set screws 33 (Figs. 2 and 5) the set screws being seated in depressed pockets 34 one such pocket lying adjacent each groove. Sufficient stock remains in the wall 35 between each pocket and its respective tool channel to support a threaded portion of the screw shank.

In a shop equipped with adjustable cutting heads constructed in accordance with the present invention, the tool room may conveniently maintain a selection of rings of varying dimensions by the use of which any normal cutting head size may be built up within a few minutes to the particular diameter desired.

Figure 7:
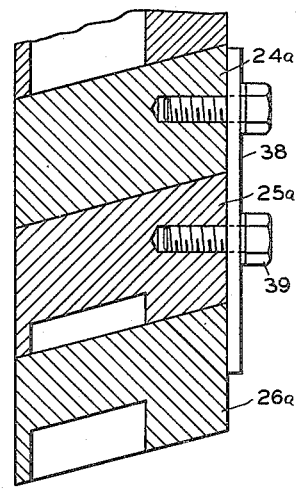
Figure 8:
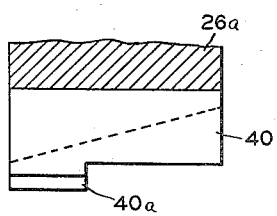
Figure 9:
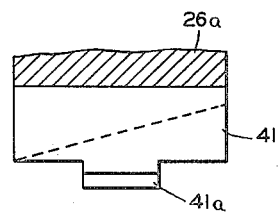
Figure 10:
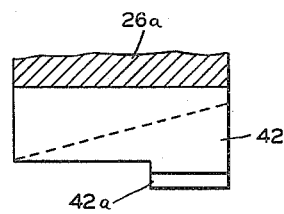

Figs. 6 and 7 illustrate a somewhat modified means for holding the ring assembly in operative position. In this embodiment one or more straps 38 are attached by screws 39 to the rear face of the rings, each such strap radially extending over a plurality of the rings, and being attached to some or all of them. Other suitable means for holding the rings in rigid assembly will be apparent to those skilled in the art.

Figs. 8, 9, 10 and 11 illustrate the adaptation of the present invention to several varieties of edge cutting operation. The views show only a fragmentary portion of outer ring 26a, the sections being taken as indicated on the outer ring of Fig. 6. The general assembly of the rings and the provision of tool grooves in the periphery thereof, are identical with those in the embodiments already shown and described. Three respective types of cutting tools identified respectively by reference characters 40, 41 and 42, are illustrated, each one having a shank portion seated in a transverse groove, and a cutting edge portion 40a, 41a and 42a projecting outwardly therefrom. The three said cutting portions are transversely staggered at successive grooves, so that in combined effect they are capable of cutting a groove of uniform cross section, and of a width equivalent to that of the total transverse extent of the cutting edges of the three tools. It will be apparent that an approximately equal number of each of the tool types 40a, 41a and 42a can be suitably spaced and successfully staggered around the periphery of the ring 26a.

Fig. 11 illustrates another embodiment of the invention adapted for the cutting of a stepped groove in a work piece 44. The groove 45 has a deeper centrally disposed channel 46 in the floor thereof. Channel 46 may conveniently be produced by one series of tools 47 having their cutting portions 47a centrally located in the peripheral grooves of ring 26b. The shallower groove 45 can be produced by two tools which have their respective cutting edges 48a and 49a at opposed ends of their respective grooves. It will be obvious that cutting edge 47a protrudes radially beyond 48a or 49a. Any desired step arrangement can be secured by proper choice and arrangement of tools.

The invention hereinabove disclosed provides means for rigidly adjusting a cutting head for performing a face cutting operation, a planing operation, or an edge cutting operation over any desired area, within reasonable bounds. Heretofore the substitution of an entire cutting head was usually necessary, or some other expedient was required which entailed an undesirable amount of set-up work. By means of the present invention it may be necessary, in a particular instance, merely to add or remove a single ring to reach the dimension desired, such operation being the work of only a few minutes.

What I claim is:

1. In apparatus of the type described wherein relative rotary cutting movement is produced between a cutting tool and a work piece, adjustable tool holding means comprising a hub, an inner ring concentric with the center of relative rotary movement and telescopingly carried on said hub, and a second ring concentric with and telescopingly carried upon said inner ring, said inner ring and said second ring having upon their respective exterior peripheral surfaces, means for retaining a cutting tool thereon.

2. In apparatus of the type described wherein relative rotary cutting movement is produced between a cutting tool and a work piece, adjustable tool holding means comprising a hub, a plurality of concentric rings arranged in a telescoping series of increasing diameter outwardly from said hub, said rings being adapted to be fixedly mounted each upon the one within and adjacent thereto, the smallest ring being attachable to said hub, each said ring having upon a circumferential peripheral surface thereof means for retaining a cutting tool thereon.

3. In apparatus of the type described wherein relative rotary cutting movement is produced between a cutting tool and a work piece, adjustable tool holding means comprising a hub, an inner ring concentric with the center of relative rotary movement, and telescopingly carried on said hub, and a second ring concentric with and telescopingly carried upon said inner ring, said inner ring and said second ring each having upon a circumferential peripheral surface thereof a circumferentially spaced series of transverse grooves, each such groove being adapted to receive a shank portion of a cutting tool.

4. In apparatus of the type described wherein relative rotary cutting movement is produced between a cutting tool and a work piece, adjustable tool holding means comprising a hub, a plurality of concentric rings arranged in a telescoping series of increasing diameter outwardly from said hub, said rings being adapted to be fixedly mounted each upon the one within and adjacent thereto, the smallest ring being attachable to said hub, each said ring having upon a circumferential peripheral surface thereof means for retaining a cutting tool thereon, a circumferentially spaced series of transverse grooves, each such groove being adapted to receive a shank portion of a cutting tool.

5. In apparatus of the type described wherein relative rotary cutting movement is produced between a cutting tool and a work piece, an adjustable tool holding head comprising a hub having a frustoconical peripheral contour, a ring having an inner frustoconical periphery seatable upon the external periphery of said hub, means for fixing said ring on said hub, the external periphery of said ring having a series of circumferentially spaced channels extending in the direction of the axis of rotation and adapted to receive a shank portion of the said cutting tool.

6. In apparatus of the type described wherein relative rotary cutting movement is produced between a cutting tool and a work piece, an adjustable tool holding head comprising a hub having a frustoconical peripheral contour concentric with the axis of relative rotation, a plurality of concentric rings arranged in a telescoping series of increasing diameter outwardly from said hub, each said ring having frustoconical internal and external wall surfaces disposed in parallel conic planes, each said ring being fixedly mountable upon the one beneath, and the smallest ring being fixedly mountable upon said hub, each said ring having upon its exterior peripheral surface an equally spaced series of transverse grooves extending in the direction of the axis of rotation, each such groove being adapted to receive a shank portion of a cutting tool, said head being readily diametrically adjustable by addition or removal of a ring whereby to space the cutting tools on the outer periphery of the outer ring at any desired distance from the axis of rotation.

ROBERT J. BRADLEY.

REFERENCES CITED

The following references are of record in the file of this patent:

UNITED STATES PATENTS

| Number | Name | Date |
| --- | --- | --- |
| 1,411,390 | Tibbetts | Apr. 4, 1922 |
| 2,392,002 | Ross | Jan. 1, 1946 |
| 2,422,111 | Lundberg | June 10, 1947 |

FOREIGN PATENTS

| Number | Country | Date |
| --- | --- | --- |
| 355,580 | Great Britain | Aug. 27, 1931 |